(12) United States Patent
Morikawa et al.

(10) Patent No.: US 8,242,046 B2
(45) Date of Patent: Aug. 14, 2012

(54) INORGANIC OXIDE, EXHAUST GAS PURIFYING CATALYST CARRIER, AND EXHAUST GAS PURIFYING CATALYST

(75) Inventors: Akira Morikawa, Nagoya (JP); Toshitaka Tanabe, Aichi (JP); Kae Yamamura, Nagoya (JP); Naoki Takahashi, Nagoya (JP); Hiromasa Suzuki, Toyota (JP); Akemi Sato, Toyota (JP); Mamoru Ishikiriyama, Fujieda (JP); Takaaki Kanazawa, Toyota (JP); Oji Kuno, Toyota (JP)

(73) Assignees: Toyota Jidosha Kabushiki Kaisha, Toyota-shi, Aichi-ken (JP); Kabushiki Kaisha Toyota Chuo, Aichi-gun, Aichi (JP)

( * ) Notice: Subject to any disclaimer, the term of this patent is extended or adjusted under 35 U.S.C. 154(b) by 42 days.

(21) Appl. No.: 10/572,040

(22) PCT Filed: Jul. 22, 2005

(86) PCT No.: PCT/JP2005/013905
§ 371 (c)(1),
(2), (4) Date: Mar. 15, 2006

(87) PCT Pub. No.: WO2006/009327
PCT Pub. Date: Jan. 26, 2006

(65) Prior Publication Data
US 2007/0104950 A1    May 10, 2007

(30) Foreign Application Priority Data

Jul. 22, 2004 (JP) ............................... P2004-214932
Jul. 22, 2004 (JP) ............................... P2004-214939
Jul. 22, 2004 (JP) ............................... P2004-214940

(51) Int. Cl.
*B01J 23/10*    (2006.01)

(52) U.S. Cl. ........................................................ 502/304
(58) Field of Classification Search .................. 428/402;
502/304
See application file for complete search history.

(56) References Cited

U.S. PATENT DOCUMENTS 5,948,723 A    9/1999   Sung
(Continued)

FOREIGN PATENT DOCUMENTS

EP           0 834 348       4/1998
(Continued)

OTHER PUBLICATIONS

International Search Report.
(Continued)

*Primary Examiner* — Emily Le
*Assistant Examiner* — Michael Forrest
(74) *Attorney, Agent, or Firm* — Finnegan, Henderson, Farabow, Garrett & Dunner, LLP

(57) ABSTRACT

A particulate inorganic oxide containing aluminum oxide, a metal oxide forming no composite oxide with aluminum oxide, and an additional element including at least one of a rare-earth element and an alkali earth element, the inorganic oxide containing a secondary particle formed by aggregating primary particles; wherein at least a part of the secondary particle includes a plurality of first primary particles, each having a particle size of 100 nm or less, containing aluminum oxide and the additional element, and a plurality of second primary particles, each having a particle size of 100 nm or less, containing the metal oxide and the additional element; wherein at least a part of the first and second primary particles has a surface concentrated region where the additional element has a locally increased content in a surface layer part thereof.

39 Claims, 1 Drawing Sheet

U.S. PATENT DOCUMENTS

| | | |
|---|---|---|
| 6,528,029 B1 | 3/2003 | Dettling et al. |
| 6,852,665 B2 | 2/2005 | Morikawa et al. |
| 7,713,908 B2 | 5/2010 | Yamamoto et al. |
| 2002/0049137 A1* | 4/2002 | Morikawa et al. ............ 502/351 |
| 2004/0186016 A1* | 9/2004 | Bog et al. ....................... 502/304 |
| 2009/0099013 A1 | 4/2009 | Morikawa et al. |

FOREIGN PATENT DOCUMENTS

| | | |
|---|---|---|
| EP | 1 175 935 | 1/2002 |
| EP | 1175935 A2 * | 1/2002 |
| JP | 05-285386 | 11/1993 |
| JP | 9-141098 | 6/1997 |
| JP | 3498453 | 6/1997 |
| JP | 9-262439 | 10/1997 |
| JP | 10-202102 | 8/1998 |
| JP | 3275356 | 2/2002 |
| JP | 2002-204956 | 7/2002 |
| JP | 2002-282692 | 10/2002 |
| JP | 2002282692 A * | 10/2002 |
| JP | 2002-331238 | 11/2002 |
| JP | 2003-074334 | 3/2003 |
| JP | 2005-193179 | 7/2005 |
| JP | 2006-35018 | 2/2006 |
| JP | 2006-035019 | 2/2006 |
| JP | 2006-036556 | 2/2006 |
| JP | 2006-055836 | 3/2006 |
| WO | WO 01/17680 | 3/2001 |
| WO | WO 2006/009321 | 1/2006 |
| WO | WO 2006/009327 | 1/2006 |
| WO | WO 2006/016633 | 2/2006 |

OTHER PUBLICATIONS

Reply to Office Action for U.S. Appl. No. 12/300,651 dated Nov. 9, 2010.
Office Action for U.S. Appl. No. 12/300,651 mailed Aug. 12, 2010.
Extended European Search Report for EP Appl. No. 07767081.8 dated Dec. 11, 2009.
International Search Report for PCT/JP2007/061660 dated Jul. 31, 2007.

* cited by examiner

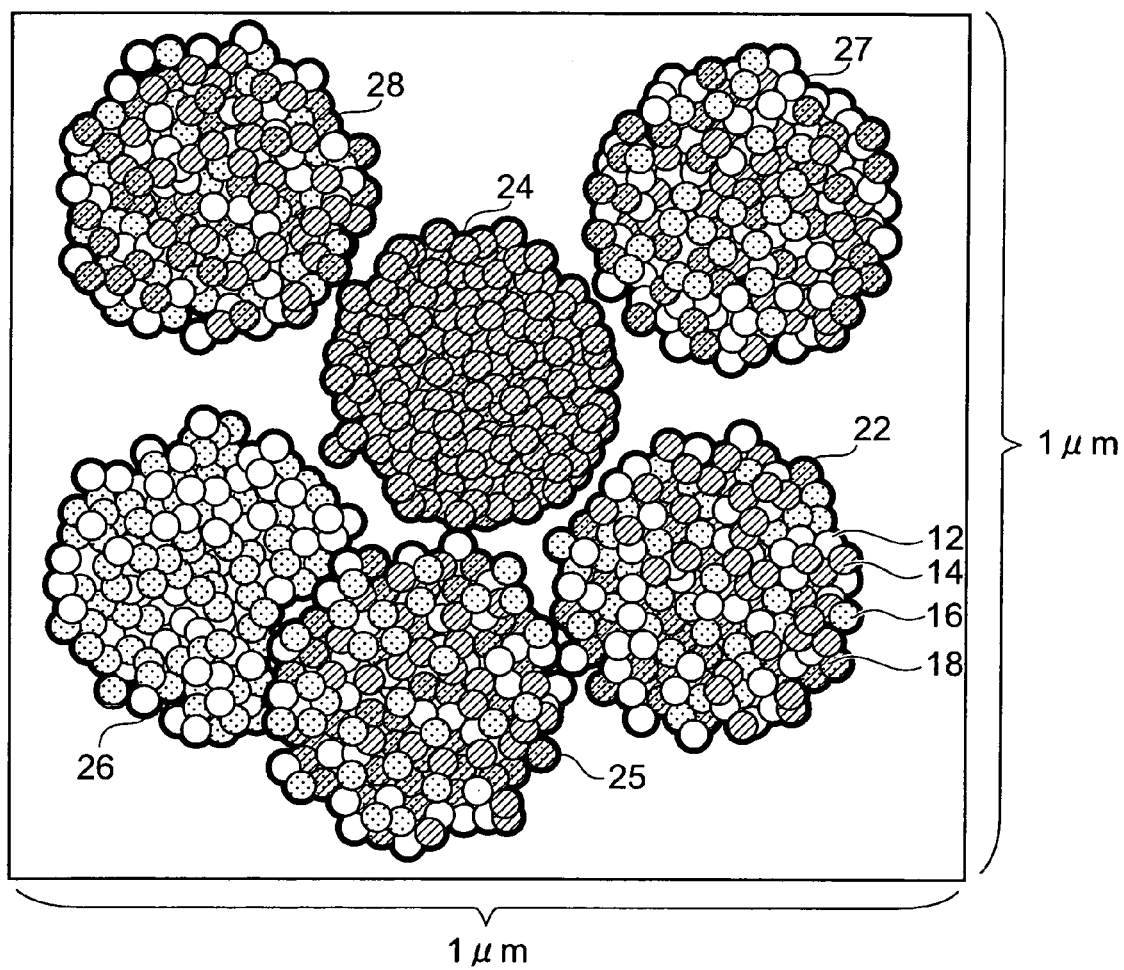

INORGANIC OXIDE, EXHAUST GAS PURIFYING CATALYST CARRIER, AND EXHAUST GAS PURIFYING CATALYST

TECHNICAL FIELD

The present invention relates to an inorganic oxide, an exhaust gas purifying catalyst carrier, and an exhaust gas purifying catalyst.

BACKGROUND ART

Exhaust gas purifying catalysts used for cleaning the exhaust of internal combustion engines and the like are required to have a very high heat resistance in order to keep a high catalytic activity even when used at a high temperature for a long period.

Known as an example of exhaust gas purifying catalysts is one in which a metal having a catalytic activity is supported on a carrier made of a particulate metal oxide. For enhancing the heat resistance of such an exhaust gas purifying catalyst, one using a carrier in which an oxide of a rare-earth element is uniformly dissolved as a solid in zirconium oxide particles (Japanese Patent Publication No. 3498453) and one using a carrier in which aluminum oxide and an oxide of a rare-earth element are combined with each other (Japanese Patent Publication No. 3275356) have been proposed so far.

DISCLOSURE OF THE INVENTION

However, the heat resistance of conventional catalysts such as those mentioned above is not always sufficient, although it is higher than that in the cases using no rare-earth elements. The inventors conducted diligent studies in order to further improve the heat resistance and, as a result, have found that the heat resistance of carriers for supporting a metal having a catalytic activity (hereinafter referred to as "catalytic metal" as the case may be) in the conventional catalysts is still insufficient. The exhaust gas of cars usually reaches a high temperature on the order of 600 to 1000° C. When the heat resistance of a carrier is insufficient, the carrier seems to advance its sintering in such a high temperature environment, thereby promoting grain growth in its supported metal. When the grain growth of the metal is promoted, its specific surface area decreases, thereby lowering the catalytic activity.

In view of such a problem in the conventional art, it is an object of the present invention to provide an inorganic oxide which can sufficiently suppress the grain growth of metals supported thereby, an exhaust gas purifying catalyst comprising the same, and an exhaust gas purifying catalyst using the same.

For achieving the above-mentioned object, in one aspect, the present invention provides a particulate inorganic oxide comprising aluminum oxide, a metal oxide forming no composite oxide with aluminum oxide, and an additional element including at least one of a rare-earth element and an alkali earth element, the inorganic oxide containing a secondary particle formed by aggregating primary particles; wherein at least a part of the secondary particle includes a plurality of first primary particles, each having a particle size of 100 nm or less, containing aluminum oxide and the additional element, and a plurality of second primary particles, each having a particle size of 100 nm or less, containing the metal oxide and the additional element; wherein at least a part of the first and second primary particles has a surface concentrated region where the additional element has a locally increased content in a surface layer part thereof; and wherein the content of the additional element in terms of the amount of an oxide thereof is 5.6 mol % or less with respect to the total amount of the additional element, aluminum in aluminum oxide, and the metal element in the metal oxide.

The above-mentioned inorganic oxide of the present invention is mainly constituted by a plurality of species of primary particles which combine aluminum oxide and another specific metal oxide with each other and differ from each other in terms of compositions on the order of nanometer scale, and contains an additional element such as a rare-earth element by a locally high concentration in a surface layer part of the primary particles, whereby the grain growth of catalyst metals supported thereby can sufficiently be suppressed even in a high temperature environment.

In the inorganic oxide constituted by the combination mentioned above, aluminum oxide and the metal oxide do not form a composite oxide with each other, whereby the above-mentioned first and second primary particles exist separately from each other. These different kinds of primary particles seem to aggregate while being interposed with each other, so as to form secondary particles, thereby becoming barriers for diffusions of their counterparts, thus suppressing the sintering due to the fusion of primary particles.

Further, in a surface layer part of primary particles constituting the inorganic particle, a surface concentrated region where the additional element has a locally increased content is formed. In other words, a region with an increased content of the additional element is formed so as to cover the surface of primary particles. However, it is not always necessary for this region to cover the surface of primary particles completely as long as at least a part of the surface layer part of primary particles is covered therewith. The above-mentioned additional element has alkalinity when forming an oxide, and thus produces a bond represented by Rh—O-M (where M is the additional element in the carrier) when rhodium (Rh) is supported. Therefore, when a large amount of a rare-earth element exists on the primary particle surface of the carrier, supported rhodium particles are harder to diffuse, whereby the grain growth of rhodium is effectively suppressed. The primary particles in the inorganic oxide contain the additional element not only in the surface layer part, but also in a part (inner layer part) inside of the surface concentrated region. When the content of the rare-earth element is enhanced not locally but throughout the primary particles including their inner layer part, however, the heat resistance of the carrier itself decreases, though interactions with catalyst metals such as rhodium become stronger, whereby the grain growth of catalyst metals is not suppressed sufficiently.

Preferably, the content of the additional element in terms of the amount of an oxide thereof is 1.5 to 5.6 mol % with respect to the total amount of the additional element, aluminum in aluminum oxide, and the metal element in the metal oxide. Preferably, at least 80% of the primary particles in the inorganic oxide have a particle size of 100 nm or less here. When each primary particle contains the additional element by a ratio falling within the specific range mentioned above, the phase stability and crystal stability of the primary particle itself in a high temperature environment can also be enhanced.

Preferably, the content of aluminum oxide is 15 to 40 mol % with respect to the total amount of aluminum in aluminum oxide, the metal element in the metal oxide, and the additional element. Preferably, at least 80% of the primary particles in the inorganic oxide have a particle size of 100 nm or less here.

Though aluminum oxide simply combined with another metal oxide may react in a solid phase with a catalyst metal such as rhodium in an oxidizing atmosphere, thereby lowering its catalytic activity, the inventors have found that, when the content of aluminum oxide falls within the above-mentioned specific range, the suppression of sintering in the carrier by diffusion barriers becomes more predominant than such an action, whereby the effect of suppressing the grain growth of catalyst metals can be obtained sufficiently.

Preferably, in the surface concentrated region, the additional element exists by 1 to 5 mass % in terms of an oxide thereof with respect to the total amount of the inorganic oxide. As a consequence, when the inorganic oxide is used as a carrier for a catalyst, a catalyst having an excellent heat resistance and a higher catalyst activity can be obtained.

In another aspect, the present invention provides a particulate inorganic oxide comprising aluminum oxide, zirconium oxide, and an additional element including at least one of a rare-earth element and an alkali earth element, the inorganic oxide containing a secondary particle formed by aggregating primary particles; wherein at least a part of the secondary particle includes a plurality of first primary particles, each having a particle size of 100 nm or less, containing aluminum oxide and the additional element, and a plurality of second primary particles, each having a particle size of 100 nm or less, containing zirconium oxide and the additional element; wherein at least a part of the first and second primary particles has a surface concentrated region where the additional element has a locally increased content in a surface layer part thereof; and wherein the content of the additional element in terms of the amount of an oxide thereof is 5.6 mol % or less with respect to the total amount of the additional element, aluminum in aluminum oxide, and zirconium in zirconium oxide.

Zirconium oxide does not substantially form a composite oxide with aluminum oxide, whereby the above-mentioned first and second primary particles are formed separately in the inorganic oxide combining these oxides. Therefore, this inorganic oxide yields effects similar to those of the inorganic oxide mentioned above.

The content of the additional element in terms of the amount of an oxide thereof is preferably 1.5 to 5.6 mol % with respect to the total amount of the additional element, aluminum in aluminum oxide, and zirconium in zirconium oxide, whereas the content of aluminum oxide is preferably 15 to 40 mol % with respect to the total amount of the additional element, aluminum in aluminum oxide, and zirconium in zirconium oxide in this case as well. Preferably, at least 80% of the primary particles in the inorganic oxide have a particle size of 100 nm or less here.

In still another aspect, the present invention provides a particulate inorganic oxide obtainable by a manufacturing method comprising a coprecipitation step of producing a coprecipitate containing aluminum, a metal element forming no composite oxide with aluminum oxide when in an oxide, and an additional element including at least one of a rare-earth element and an alkali earth element from a solution containing aluminum, the metal element, and the additional element dissolved therein; a first baking step of yielding an oxide mixture by baking the coprecipitate; and a second baking step of attaching the additional element including at least one of a rare-earth element and an alkali earth element to the mixture and further baking the mixture; wherein, in the manufacturing method, the content of the additional element in terms of the amount of an oxide thereof is 4.0 mol % or less with respect to the total amount of the additional element, aluminum, and the metal element.

In still another aspect, the present invention provides a particulate inorganic oxide obtainable by a manufacturing method comprising a coprecipitation step of producing a coprecipitate containing aluminum, zirconium, and an additional element including at least one of a rare-earth element and an alkali earth element from a solution containing aluminum, zirconium, and the additional element dissolved therein; a first baking step of yielding an oxide mixture by baking the coprecipitate; and a second baking step of attaching the additional element including at least one of a rare-earth element and an alkali earth element to the mixture and further baking the mixture; wherein, in the manufacturing method, the content of the additional element in terms of the amount of an oxide thereof is 4.0 mol % or less with respect to the total amount of the additional element, aluminum, and zirconium.

Primary particles of the inorganic oxide obtainable by the manufacturing methods combining the specific materials and steps mentioned above mainly contain the part derived from the coprecipitate as the additional element in an inner layer part near the center thereof, and mainly contain the part attached to the mixture after the first baking as the additional element in a surface layer part thereof. As a consequence, the primary particles have a surface concentrated region where the additional element has a locally increased content in the surface layer part. Therefore, the inorganic oxides obtainable by the above-mentioned manufacturing methods have substantially the same configuration as with those mentioned above, and thus can sufficiently suppress the grain growth of catalyst metals supported thereby when used as a carrier for a metal even in a high temperature environment.

Preferably, the coprecipitate is produced from a solution having aluminum, the metal element (or zirconium), and the additional element dissolved therein, whereas the content of the additional element in terms of the amount of an oxide thereof in the solution is 0.20 to 4.0 mol % with respect to the total amount of the additional element, aluminum, and the metal element (or zirconium).

Preferably, the coprecipitate is produced from a solution containing aluminum, the metal element (or zirconium), and the additional element dissolved therein, whereas the content of aluminum in terms of the amount of an oxide thereof in the solution is 15 to 40 mol % with respect to the total amount of aluminum, the metal element (or zirconium), and the additional element. In this case, the inorganic oxide contains aluminum oxide by a specific ratio reflecting the composition of the solution yielding the coprecipitate.

Preferably, in the second baking step, the additional element is attached by such an amount as to become 1 to 5 mass % in terms of the amount of an oxide thereof with respect to the total amount of the inorganic oxide obtained. As a consequence, when the inorganic oxide is used as a carrier for a catalyst, a catalyst having an excellent heat resistance and a higher catalytic activity is obtained.

Preferably, the coprecipitate is baked by heating to 600 to 1200° C. in an oxidizing atmosphere in the first baking step, and the mixture having the additional element attached thereto is baked by heating to 500 to 900° C. in the second baking step.

Preferably, as the additional element contained in the foregoing inorganic oxides in accordance with the present invention, the rare-earth element is at least one species of element selected from the group consisting of yttrium, lanthanum, praseodymium, neodymium, samarium, europium, gadolinium, terbium, dysprosium, holmium, erbium, thulium, ytterbium, and lutetium, whereas the alkali earth element is at least one species of element selected from the group consisting of magnesium, calcium, strontium, and barium. Preferred among them as the additional element from the viewpoint of heat resistance is at least one species of element selected from yttrium, lanthanum, praseodymium, neodymium, ytterbium, magnesium, calcium, and barium, lanthanum or neodymium in particular.

The exhaust gas purifying catalyst carrier in accordance with the present invention is one containing any of the above-mentioned inorganic oxides in accordance with the present invention, whereas the exhaust gas purifying catalyst in accordance with the present invention is one comprising this exhaust gas purifying catalyst carrier and rhodium supported thereby. Preferably, at least a part of rhodium in the catalyst is supported so as to come into contact with a region where the additional element has a locally increased content in the surface layer part of primary particles in the inorganic oxide. Since the inorganic oxide in accordance with the present invention is used as a carrier, the exhaust gas purifying catalyst of the present invention sufficiently suppresses the grain growth of supported rhodium even in a high temperature environment.

BRIEF DESCRIPTION OF THE DRAWINGS

FIG. 1 is a schematic view showing an FE-STEM image of the inorganic oxide in accordance with an embodiment of the present invention.

BEST MODES FOR CARRYING OUT THE INVENTION

In the following, preferred embodiments of the present invention will be explained in detail. However, the present invention will not be limited to the following embodiments.

The inorganic oxide of the present invention is constituted by a particulate mixture containing aluminum oxide, a metal oxide forming no composite oxide with aluminum oxide, and an additional element including at least one of a rare-earth element and an alkali earth element. This inorganic oxide contains a secondary particle formed by aggregating primary particles.

Aluminum oxide ($Al_2O_3$) in the inorganic oxide may be amorphous (e.g., activated alumina) or crystalline.

The metal oxide forming no composite oxide with aluminum oxide is an oxide which does not form a primary particle constituted by a composite oxide in combination with aluminum oxide in a state substantially uniformly dissolved as solids or dispersed into each other. In other words, this metal oxide forms a primary particle separately from a primary particle mainly constituted by aluminum oxide when a coprecipitate in which a hydroxide of the metal oxide as its precursor and aluminum hydroxide are coprecipitated is baked. Therefore, the inorganic oxide of the present invention contains a primary particle mainly constituted by aluminum oxide (a first primary particle containing aluminum oxide as a main ingredient) and a second primary particle containing a metal oxide other than aluminum oxide as a main ingredient. This suppresses the sintering of carriers in a high temperature environment further remarkably. The fact that the respective primary particles are formed separately from each other as such can be verified by an analyzing method which will be explained later and the like.

Here, the "primary particle mainly constituted by aluminum oxide" refers to a primary particle formed from aluminum oxide as a main ingredient. Specifically, it will be preferred if the particle mainly constituted by aluminum oxide is such that at least one half thereof in terms of molar ratio or weight ratio is constituted by aluminum oxide. Similar expressions such as "primary particle mainly constituted by a metal oxide" and "primary particle mainly constituted by zirconium oxide" refer to details similar to those mentioned above.

At least a part of each of the first and second primary particles further contains an additional element. The first primary particle may contain a small amount of the above-mentioned metal oxide or the like in its surface layer part, whereas the second primary particle may contain a small amount of aluminum oxide or the like in its surface layer part.

At least a part of the secondary particle in the inorganic oxide is formed by aggregating a plurality of first primary particles each having a particle size of 100 nm or less and a plurality of second primary particles each having a particle size of 100 nm or less. In other words, the inorganic oxide contains a secondary particle constituted by a plurality of first primary particles each having a particle size of 100 nm or less and a plurality of second primary particles each having a particle size of 100 nm or less. As a consequence, the respective primary particles having compositions different from each other become barriers for diffusions of their counterparts, thus suppressing the sintering of carriers in a high temperature environment. The fact that respective primary particles having compositions different from each other are formed separately from each other and aggregate to form the secondary particle can be verified by an analyzing method which will be explained later and the like.

Preferably, at least 80% of the primary particles in terms of the number of particles in the inorganic oxide have a particle size of 100 nm or less in order to increase the specific surface area and enhance the catalytic activity. The ratio of primary particles having a particle size of 100 nm or less is at least 90%, more preferably at least 95%. The particle size is the largest among diameters definable in one particle. The average particle size of primary particles in the whole particulate inorganic oxide is preferably 1 to 50 nm, more preferably 3 to 40 nm.

Particle sizes of primary particles, their respective compositions, and the state of aggregation of secondary particles can be verified by observing and analyzing the inorganic oxide while appropriately combining TEM (transmission electron microscope), SEM (scanning electron microscope), FE-STEM (field emission scanning transmission electron microscope), EDX (energy dispersive x-ray detector), XPS (x-ray photoelectron spectroscope), and the like.

As the metal oxide forming no composite oxide with aluminum oxide, at least one species selected from the group consisting of zirconium oxide ($ZrO_2$), silicon oxide ($SiO_2$), and titanium oxide ($TiO_2$) can be used favorably. Among them, zirconium oxide is preferred in particular. Zirconium oxide yields a catalyst having particularly excellent heat resistance and catalytic activity, for example, in combination with rhodium as a catalytic metal.

The inorganic oxide usually contains the rare-earth element and alkali earth element in the form of their oxides. The rare-earth element is preferably at least one species of element selected from the group consisting of yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu), more preferably at least one species of element selected from the group consisting of yttrium, lanthanum, praseodymium, neodymium, and ytterbium. On the other hand, the alkali earth element is at least one species of element selected from the group consisting of magnesium (Mg), calcium (Ca), strontium (Sr), and barium (Ba), more preferably at least one species of element selected from the group consisting of magnesium, calcium, and barium. Further preferably, from the viewpoint of heat resistance or the like as a support, lanthanum or neodymium, which is a rare-earth element, is used as the additional element. In this case, lanthanum and neodymium may be used together. Additional elements different from each other may be contained in the inorganic oxide in a surface concentrated region which will be explained later and another region, respectively.

The additional element in the inorganic oxide exists mainly as its oxide in a state dissolved as a solid, diffused, or the like with respect to aluminum oxide or the above-mentioned metal oxide. In particular, in order to exhibit the effect of the present invention due to the additional element more remarkably, it will be preferred if at least a part of the additional element is dissolved as a solid in aluminum oxide or the above-mentioned metal oxide in an inner layer part (a part other than the surface concentrated region) of the primary particles in the inorganic oxide. More preferably, in this case, both of aluminum oxide and the above-mentioned metal oxide have the additional element dissolved as a solid therein.

The content of the additional element in terms of the amount of an oxide thereof in the inorganic oxide is 5.6 mol % or less with respect to the total amount of the additional element, aluminum in aluminum oxide, and the metal element in the metal oxide. The content of the additional element is preferably 1.5 to 5.6 mol %, more preferably 2.0 to 4.0 mol %, further preferably 2.5 to 3.8 mol %. When the content of the oxide of the additional element is less than 1.5 mol % or more than 5.6 mol %, the grain growth of catalytic metals is less likely to be suppressed in a high temperature environment. When the additional element exceeds 5.6 mol %, its interaction with catalytic metals tends to become too strong, thereby lowering the catalytic activity.

FIG. 1 is a schematic view showing an image of the inorganic oxide in accordance with an embodiment of the present invention when observed with an FE-STEM. The inorganic oxide in the image of FIG. 1 contains zirconium oxide as a metal oxide forming no composite oxide with aluminum oxide, and lanthanum as an additional element. In this image, secondary particles 22, 24, 25, 26, 27, and 28 are formed by aggregating a plurality of species of primary particles having respective compositions different from each other. Primary particles 12 mainly constituted by aluminum oxide, primary particles 14 mainly constituted by zirconium oxide, primary particles 16 mainly constituted by aluminum oxide and lanthanum oxide, and primary particles 18 mainly constituted by zirconium oxide and lanthanum oxide exist as primary particles. No primary particles are formed by a composite oxide in which aluminum oxide and zirconium oxide are substantially uniformly dissolved as solids or dispersed into each other. Compositions and distribution states of oxides in the primary particles can be analyzed by an EDX and the like.

Each of the secondary particles 22, 25, 27, and 28 is formed by aggregating the primary particles 12, 14, 16, and 18. Secondary particles such as the secondary particle 24 constituted by the primary particles 14 and 18 and the secondary particle 26 constituted by the primary particles 12 and 16 may partly exist as well. When the secondary particles 24 and 26 exist, metal elements contained in these secondary particles are preferably 30 mol % or less, more preferably 15 mol % or less, further preferably 10 mol % or less with respect to all the metal elements present in the inorganic oxide.

At least a part of the primary particles constituting the above-mentioned inorganic oxide has a surface concentrated region where the additional element has a locally increased content in a surface layer part thereof. Among the primary particles constituting the inorganic oxide, substantially all of those containing lanthanum oxide preferably have the surface concentrated region, though primary particles having no surface concentrated region may be mixed therewith to such an extent that the effects of the present invention are not remarkably lost thereby. The additional element may also exist in the surface layer part of primary particles not containing lanthanum oxide as a major constituent.

The content of the additional element in the surface concentrated region is higher than the content thereof in a region on the inner side of the particles. The surface concentrated region is formed so as to cover the surface of a primary particle while having a certain extent of depth, but is not required to cover the whole surface of the primary particle completely. Usually, the content of the additional element in the primary particle gradually increases from the inner layer side to the surface layer side. Therefore, the surface concentrated region and the particle center part on the inner layer side thereof do not always form a clear boundary.

The additional element in the surface concentrated region exists in the surface layer part of the primary particle. The amount of the additional element existing in the surface concentrated region is preferably 1 to 5 mass % with respect to the total amount of the inorganic oxide. When the amount is less than 1 mass % or more than 5 mass %, the effect of the additional element improving the heat resistance of the catalyst tends to decrease.

The additional element existing in the surface concentrated region elutes out when coming into contact with an acidic solution such as aqueous nitric acid solution. Therefore, the amount of the additional element existing in the surface concentrated region can be verified by quantitatively determining the amount of the additional element eluting into an aqueous nitric acid solution when the inorganic oxide is brought into contact therewith. More specifically, for example, 0.1 g of the inorganic oxide is added to 10 ml of a 1-N aqueous nitric acid solution, the resulting mixture is stirred for 2 hours so as to elute out the additional element existing in the surface concentrated region, and the amount of thus eluted additional element is quantitatively determined by a chemical analysis, whereby the amount of the existing additional element can be seen.

The inorganic oxide containing a primary particle having such a surface concentrated region can be obtained, for example, by attaching an additional element to a particle of a mixture constituted by a plurality of species of oxides containing an oxide of the additional element, and further baking the resulting product. In the primary particle of the inorganic oxide obtained by this method, a major part of the attached additional element becomes an oxide upon baking, and exists in the surface layer part of the primary particle, thereby forming a surface concentrated region.

When yielding the inorganic oxide containing a primary particle having a surface concentrated region by the above-mentioned method, it will be preferred if the amount of the additional element attached to the mixture of oxides is 1 to 5 mass % in terms of the mass of an oxide thereof with respect to the total amount of the inorganic oxide obtained. This allows the resulting inorganic oxide to have about 1 to 5 mass % of the additional element existing in the surface layer part of its primary particle with respect to the total amount of the inorganic oxide.

The fact that the surface concentrated region such as the one mentioned above is formed in the primary particle of the inorganic oxide can be seen not only by the method of eluting the additional element as mentioned above, but also by analyzing the composition by using such a method as EDX (energy dispersive x-ray detector) or SIMS (secondary ion mass spectrometer), and comparing the content of the additional element between the surface layer part and center part of the inorganic oxide, for example. Instead of directly analyzing the composition of the center part of the primary particle, the composition of the inorganic oxide may be analyzed by such a method as ICP (inductively coupled plasma emission spectrophotometer), so as to quantitatively determine the content of the additional element as an average value in the whole inorganic oxide and verify that the content of the additional element in the surface layer part is higher than the average value.

The inorganic oxide such as the one explained in the foregoing can favorably be obtained, for example, by a manufacturing method comprising a coprecipitation step of producing a coprecipitate containing aluminum, a metal element forming no composite oxide with aluminum oxide when in an oxide, and an additional element including at least one of a rare-earth element and an alkali earth element; a first baking step of yielding an oxide mixture by baking the coprecipitate; and a second baking step of attaching the additional element including at least one of a rare-earth element and an alkali earth element to the mixture and further baking the mixture.

The above-mentioned coprecipitate is produced from a solution in which aluminum, the above-mentioned metal element, and the additional element are dissolved. The content of the additional element in terms of the amount of an oxide thereof in the solution is preferably 0.20 to 4.0 mol %, more preferably 0.5 to 3.8 mol % with respect to the total amount of the additional element, alumina, and the above-mentioned metal element. When the additional element in the solution is less than 0.20 mol % or more than 4.0 mol %, the effect of suppressing the grain growth of catalytic metals tends to decrease when the resulting inorganic oxide is used as a carrier.

The content of aluminum in terms of the amount of an oxide ($Al_2O_3$) thereof in the above-mentioned solution in which aluminum, the above-mentioned metal element, and the additional element are dissolved is preferably 15 to 40 mol % with respect to the total amount of aluminum, the above-mentioned metal element, and the additional element. This allows the resulting inorganic oxide to have an aluminum oxide content of about 15 to 40 mol %. The content is more preferably 16 to 35 mol %, more preferably 20 to 30 mol %.

As the above-mentioned solution, one in which salts or the like of respective metal elements constituting the inorganic oxide are dissolved in water, alcohol, or the like is used favorably. Examples of the salts include sulfates, nitrates, hydrochlorides, and acetates.

This solution is mixed with an alkali solution, and so forth, so as to adjust the pH of the solution such that it falls within a range (e.g., a pH of 9 or higher) where respective hydroxides of the metal elements are deposited, whereby a coprecipitate containing aluminum or the like is produced. As the alkali solution, an ammonia or ammonium carbonate solution is preferred from the viewpoint of its easiness in removal upon evaporation at the time of baking and the like.

In the subsequent first baking step, thus obtained coprecipitate is baked by heating preferably after being centrifuged and washed, so as to yield a mixture of oxides. In the first baking step, the coprecipitate is baked by heating at 600 to 1200° C. in an oxidizing atmosphere such as air preferably for 0.5 to 10 hours.

In the second baking step, the additional element is attached to the mixture of oxides, and the resulting product is further baked, whereby a particulate inorganic oxide is obtained. The attachment can be effected by a method of suspending the mixture of oxides in a solution in which a salt of the additional element (nitrate or the like) is dissolved and stirring them. In the second baking step, the mixture having the additional element attached thereto is baked by heating at 500 to 1200° C. preferably in an oxidizing atmosphere for 0.5 to 10 hours.

The exhaust gas purifying catalyst carrier of the present invention is a carrier containing at least the inorganic oxide explained in the foregoing. This carrier can favorably carry at least one species of rare metal selected from the group consisting of rhodium, platinum, and palladium, for example.

The exhaust gas purifying catalyst of the present invention comprises the above-mentioned exhaust gas purifying catalyst carrier of the present invention and rhodium supported thereby. Since the above-mentioned inorganic oxide of the present invention is used as a carrier, the grain growth of rhodium supported thereby can sufficiently be suppressed in this catalyst even in a high temperature environment. Rhodium can be supported by the carrier by employing a conventionally known method such as dipping.

Preferably, at least a part of rhodium in the exhaust gas purifying catalyst of the present invention is supported so as to come into contact with a region (surface concentrated region) where the additional element has a locally increased content in a surface layer part of a primary particle of the inorganic oxide. This exhibits the effect of the additional element suppressing the grain growth of rhodium more remarkably.

For exhibiting a sufficiently high catalytic activity, the amount by which rhodium is supported is preferably 0.01 to 3 mass %, more preferably 0.05 to 2 mass %, further preferably 0.1 to 1 mass % with respect to the mass of the carrier.

The mode of use of the exhaust gas purifying catalyst is not restricted in particular. For example, a layer made of the exhaust gas purifying catalyst can be formed on a surface of a base such as a monolith base in a honeycomb form, a pellet base, or a foam base, and disposed in an exhaust flow path in an internal combustion engine or the like for use.

EXAMPLES

In the following, the present invention will be explained more specifically with reference to examples and comparative examples. However, the present invention is not limited to the following examples.

Example 1

Preparation of Catalyst

While being fully stirred, a solution obtained by dissolving 1 mol of aluminum nitrate nonahydrate, 0.95 mol of zirconium oxynitrate dihydrate, and 0.05 mol of lanthanum nitrate hexahydrate into 1600 mL of ion-exchanged water was added to aqueous ammonia containing ammonia by 1.2 times the neutralization equivalent of metal cations in the solution, so as to yield a pH of 9 or higher in the solution, whereby hydroxides of aluminum, zirconium, and lanthanum were coprecipitated, thus producing a coprecipitate containing them. After being centrifuged and then fully washed, the coprecipitate was temporarily baked by heating in the air at 400° C. for 5 hours. Subsequently, the solid obtained after the temporal baking was baked by heating in the air at 700° C. for 5 hours and then at 900° C. for 5 hours (first baking), whereby a mixture of oxides containing aluminum oxide, zirconium oxide, and lanthanum oxide was obtained. The composition ratio of the mixture was aluminum oxide/zirconium oxide/lanthanum oxide=50/95/2.5 (molar ratio).

A suspension in which 47.5 g of thus obtained mixture were suspended in an aqueous lanthanum nitrate solution in which 6.5 g of lanthanum nitrate hexahydrate (by an amount to become 5 mass % in terms of the amount of lanthanum oxide with respect to the total amount of the resulting inorganic oxide) were dissolved was stirred for 2 hours. Thereafter, the solid left after evaporating water from the suspension was baked by heating in the air at 110° C. for 12 hours and then at 800° C. for 5 hours (second baking), whereby a particulate inorganic oxide was obtained. Since lanthanum was further added as a posterior additional element after forming a composite oxide, the content of lanthanum as the additional element in the surface layer part was locally enhanced. When thus obtained inorganic oxide was observed by a TEM, it was seen that a plurality of first primary particles, each having a particle size of 100 nm or less, containing aluminum oxide and the additional element, and a plurality of second primary particles, each having a particle size of 100 nm or less, containing lanthanum oxide and the additional element aggregated while being interposed with each other, thereby forming secondary particles.

Thus obtained inorganic oxide as a carrier was added to an aqueous $Rh(NO_3)_3$ solution, the resulting mixture was stirred, and water was evaporated therefrom. The remaining solid was baked by heating in the air at 500° C. for 3 hours. The baked product was formed into a pellet having a length of 0.5 to 1 mm, whereby a catalyst in which rhodium was supported by the carrier was obtained. The amount of supported rhodium was about 0.5 g with respect to 100 g of the carrier.

Catalyst Durability (Heat Resistance) Test

Thus obtained pellet-shaped catalyst was left in a durability tester, so as to form a catalyst layer, and a durability test was performed for 25 hours, in which rich and lean gases having respective compositions shown in Table 1 were alternately caused to circulate through the catalyst layer at intervals of 5 minutes while setting the catalyst layer inlet gas temperature to 1000° C. and the space velocity to 10000/hr. For the catalyst after the durability test, the rhodium dispersibility (the ratio of rhodium atoms existing in the particle surface in all the rhodium atoms) was measured by CO absorption. A greater value of rhodium dispersibility corresponds to keeping a larger specific surface area, and means that the grain growth of rhodium particles is suppressed.

TABLE 1

| | Composition ratio (vol %) | | | | |
|---|---|---|---|---|---|
| | CO | $CO_2$ | $O_2$ | $H_2O$ | $N_2$ |
| Rich gas | 2 | 10 | 0 | 3 | remainder |
| Lean gas | 0 | 10 | 1 | 3 | remainder |

Example 2

The preparation of an inorganic oxide and a catalyst, and a catalyst durability test were carried out as in Example 1 except that the second baking temperature was 500° C.

Example 3

The preparation of an inorganic oxide and a catalyst, and a catalyst durability test were carried out as in Example 1 except that the second baking temperature was 900° C.

Example 4

The preparation of an inorganic oxide and a catalyst, and a catalyst durability test were carried out as in Example 1 except that the mixture after the first baking was suspended in an aqueous neodymium nitrate solution in which 6.6 g of neodymium nitrate hexahydrate were dissolved instead of lanthanum nitrate hexahydrate.

Example 5

The preparation of an inorganic oxide and a catalyst, and a catalyst durability test were carried out as in Example 2 except that the mixture after the first baking was suspended in an aqueous neodymium nitrate solution in which 6.6 g of neodymium nitrate hexahydrate were dissolved instead of lanthanum nitrate hexahydrate.

Example 6

The preparation of an inorganic oxide and a catalyst, and a catalyst durability test were carried out as in Example 3 except that the mixture after the first baking was suspended in an aqueous neodymium nitrate solution in which 6.6 g of neodymium nitrate hexahydrate were dissolved instead of lanthanum nitrate hexahydrate.

Example 7

The preparation of an inorganic oxide and a catalyst, and a catalyst durability test were carried out as in Example 1 except that a coprecipitate was produced by using a solution obtained by dissolving 1 mol of aluminum nitrate nonahydrate, 0.95 mol of zirconium oxynitrate dihydrate, and 0.05 mol of neodymium nitrate hexahydrate into 1600 mL of ion-exchanged water, and that the composition ratio of the mixture was aluminum oxide/zirconium oxide/neodymium oxide=50/95/2.5 (molar ratio).

Comparative Example 1

The preparation of an inorganic oxide and a catalyst, and a catalyst durability test were carried out as in Example 1 except that the composition ratio of the mixture after the first baking was zirconium oxide/lanthanum oxide=95/2.5 (molar ratio) without using aluminum nitrate.

Comparative Example 2

A precipitate of aluminum hydroxide was obtained from an aqueous aluminum nitrate solution as in a procedure by which the coprecipitate was obtained in Example 1, and was baked under the same condition as that of the first baking in Example 1, whereby aluminum oxide particles were obtained. These aluminum oxide particles and a mixture constituted by zirconium oxide and lanthanum oxide after the first baking obtained as in Comparative Example 1 were uniformly mixed with each other so as to yield a composition ratio of aluminum oxide/zirconium oxide/lanthanum oxide=50/95/2.5 (molar ratio). Further, the attachment of lanthanum as the posterior additional element and the second baking were effected as in Example 1, whereby a particulate inorganic oxide was obtained. When thus obtained inorganic oxide was observed by a TEM, it was seen that a secondary particle in which a plurality of first primary particles made of aluminum oxide were aggregated and a secondary particle in which a plurality of second primary particles containing lanthanum oxide and the additional element were aggregated were formed respectively.

Comparative Example 3

A mixture after the first baking obtained as in Example 1 was used as it was as a carrier, and was caused to support rhodium as in Example 1, whereby the preparation of an inorganic oxide and a catalyst, and a catalyst durability test were carried out.

TABLE 2

| | Mixture composition (molar ratio) | | | Posterior additional element | | | Rhodium dispersibility (%) |
|---|---|---|---|---|---|---|---|
| | $Al_2O_3$ | $ZrO_2$ | $La_2O_3$ or $Nd_2O_3$ | Species of element | Added amount (mass %) | $2^{nd}$ baking temperature (° C.) | |
| Example 1 | 50 | 95 | 2.5($La_2O_3$) | La | 5 | 800 | 8.3 |
| Example 2 | 50 | 95 | 2.5($La_2O_3$) | La | 5 | 500 | 9.1 |
| Example 3 | 50 | 95 | 2.5($La_2O_3$) | La | 5 | 900 | 8.0 |
| Example 4 | 50 | 95 | 2.5($La_2O_3$) | Nd | 5 | 800 | 8.4 |
| Example 5 | 50 | 95 | 2.5($La_2O_3$) | Nd | 5 | 500 | 9.5 |
| Example 6 | 50 | 95 | 2.5($La_2O_3$) | Nd | 5 | 900 | 8.2 |
| Example 7 | 50 | 95 | 2.5($Nd_2O_3$) | La | 5 | 800 | 8.1 |
| Comparative Example 1 | — | 95 | 2.5($La_2O_3$) | La | 5 | 800 | 6.6 |
| Comparative Example 2 | 50 | 95 | 2.5($La_2O_3$) | La | 5 | 800 | 3.7 |
| Comparative Example 3 | 50 | 95 | 2.5($La_2O_3$) | — | — | — | 7.0 |

As shown in Table 2, the catalysts of Examples 1 to 7 obtained by further attaching lanthanum or neodymium to a mixture containing lanthanum or neodymium yielded a sufficiently large value of rhodium dispersibility after the durability test in a high temperature environment. By contrast, the rhodium dispersibility after the durability test was low in Comparative Example 1 containing no aluminum oxide, Comparative Example 2 in which aluminum oxide and zirconium oxide construct respective secondary particles, and Comparative Example 3 having no posterior additional element attached thereto. Hence, the present invention was seen to yield an inorganic oxide which sufficiently suppressed the grain growth of catalytic metals supported thereby, and an exhaust gas purifying catalyst using the same.

Example 8

Preparation of Catalyst

While being fully stirred, a solution obtained by dissolving 1 mol of aluminum nitrate nonahydrate, 0.95 mol of zirconium oxynitrate dihydrate, and 0.008 mol of lanthanum nitrate hexahydrate into 1600 mL of ion-exchanged water was added to aqueous ammonia containing ammonia by 1.2 times the neutralization equivalent of metal cations in the solution, so as to yield a pH of 9 or higher in the solution, whereby hydroxides of aluminum, zirconium, and lanthanum were coprecipitated, thus producing a coprecipitate containing these metal elements. After being centrifuged and then fully washed, the coprecipitate was temporarily baked by heating in the air at 400° C. for 5 hours. Subsequently, the solid obtained after the temporal baking was baked by heating in the air at 700° C. for 5 hours and then at 900° C. for 5 hours (first baking), whereby a mixture of oxides containing aluminum oxide, zirconium oxide, and lanthanum oxide was obtained. The composition ratio of the mixture was aluminum oxide/zirconium oxide/lanthanum oxide=50/95/0.4 (molar ratio). Namely, the content of lanthanum in terms of the amount of an oxide ($La_2O_3$) thereof in the mixture of oxides was 0.20 mol % with respect to the total amount of lanthanum, aluminum, and zirconium.

A suspension in which 47.5 g of thus obtained mixture were suspended in an aqueous lanthanum nitrate solution in which 6.5 g of lanthanum nitrate hexahydrate (by an amount to become 5 mass % in terms of the amount of lanthanum oxide with respect to the total amount of the resulting inorganic oxide) containing lanthanum as a posterior additional element were dissolved was stirred for 2 hours. Thereafter, the solid left after evaporating water from the suspension was baked by heating in the air at 110° C. for 12 hours and then at 800° C. for 5 hours (second baking), whereby a particulate inorganic oxide was obtained. The content of lanthanum oxide in thus obtained inorganic oxide with respect to the total amount of lanthanum oxide, aluminum oxide, and zirconium oxide was 1.56 mol %. When thus obtained inorganic oxide was observed by a TEM, it was seen that at least 80% of its primary particles had a particle size of 100 nm or less.

Thus obtained inorganic oxide as a carrier was added to an aqueous $Rh(NO_3)_3$ solution, the resulting mixture was stirred, and water was evaporated therefrom. The remaining solid was baked by heating in the air at 500° C. for 3 hours. The baked product was formed into a pellet having a length of 0.5 to 1 mm, whereby a catalyst in which rhodium was supported by the carrier was obtained. The amount of supported rhodium was about 0.5 g with respect to 100 g of the carrier.

Catalyst Durability (Heat Resistance) Test

Thus obtained pellet-shaped catalyst was left in a durability tester, so as to form a catalyst layer, and a durability test was performed for 5 hours, in which rich and lean gases having respective compositions shown in Table 1 were alternately caused to circulate through the catalyst layer at intervals of 5 minutes while setting the catalyst layer inlet gas temperature to 1000° C. and the space velocity to 10000/hr. For the catalyst after the durability test, the rhodium dispersibility (the ratio of rhodium atoms existing on the particle surface in all the rhodium atoms) was measured by CO absorption. A greater value of rhodium dispersibility corresponds to keeping a larger specific surface area, and means that the grain growth of rhodium particles is suppressed in a high temperature environment.

Example 9

The preparation of an inorganic oxide and a catalyst, and a catalyst durability test were carried out as in Example 8 except that a coprecipitate was produced by using a solution obtained by dissolving 1 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture was aluminum oxide/zirconium oxide/lanthanum oxide=50/95/2.5 (molar ratio), and that the content of lanthanum oxide in the mixture with respect to the total amount of lanthanum oxide, aluminum oxide, and zirconium oxide was 1.25 mol %. In thus obtained inorganic oxide, the content of lanthanum oxide was 2.6 mol % with respect to the total amount of lanthanum oxide, aluminum oxide, and zirconium oxide, whereas at least 80% of primary particles had a particle size of 100 nm or less.

Example 10

The preparation of an inorganic oxide and a catalyst, and a catalyst durability test were carried out as in Example 1 except that a coprecipitate was produced by using a solution obtained by dissolving 1 mol of aluminum nitrate nonahydrate, 0.95 mol of zirconium oxynitrate dihydrate, and 0.08 mol of lanthanum nitrate hexahydrate into 1600 mL of ion-exchanged water, that the composition ratio of the mixture was aluminum oxide/zirconium oxide/lanthanum oxide=50/95/4 (molar ratio), and that the content of lanthanum oxide in the mixture with respect to the total amount of lanthanum oxide, aluminum oxide, and zirconium oxide was 1.97 mol %. In thus obtained inorganic oxide, the content of lanthanum oxide was 3.32 mol % with respect to the total amount of lanthanum oxide, aluminum oxide, and zirconium oxide, whereas at least 80% of primary particles had a particle size of 100 nm or less.

Example 11

The preparation of an inorganic oxide and a catalyst, and a catalyst durability test were carried out as in Example 8 except that a coprecipitate was produced by using a solution obtained by dissolving 1 mol of aluminum nitrate nonahydrate, 0.95 mol of zirconium oxynitrate dihydrate, and 0.12 mol of lanthanum nitrate hexahydrate into 1600 mL of ion-exchanged water, that the composition ratio of the mixture was aluminum oxide/zirconium oxide/lanthanum oxide=50/95/6 (molar ratio), and that the content of lanthanum oxide in the mixture with respect to the total amount of lanthanum oxide, aluminum oxide, and zirconium oxide was 2.9 mol %. In thus obtained inorganic oxide, the content of lanthanum oxide was 4.24 mol % with respect to the total amount of lanthanum oxide, aluminum oxide, and zirconium oxide, whereas at least 80% of primary particles had a particle size of 100 nm or less.

Example 12

The preparation of an inorganic oxide and a catalyst, and a catalyst durability test were carried out as in Example 8 except that a coprecipitate was produced by using a solution obtained by dissolving 1 mol of aluminum nitrate nonahydrate, 0.95 mol of zirconium oxynitrate dihydrate, and 0.17 mol of lanthanum nitrate hexahydrate into 1600 mL of ion-exchanged water, that the composition ratio of the mixture was aluminum oxide/zirconium oxide/lanthanum oxide=50/95/8.5 (molar ratio), and that the content of lanthanum oxide in the mixture with respect to the total amount of lanthanum oxide, aluminum oxide, and zirconium oxide was 4.0 mol %. In thus obtained inorganic oxide, the content of lanthanum oxide was 5.34 mol % with respect to the total amount of lanthanum oxide, aluminum oxide, and zirconium oxide, whereas at least 80% of primary particles had a particle size of 100 nm or less.

Example 13

The preparation of an inorganic oxide and a catalyst, and a catalyst durability test were carried out as in Example 8 except that 47.5 g of a mixture after the first baking obtained as in Example 9 were suspended in a solution in which 6.6 g of neodymium nitrate hexahydrate (by an amount to become 5 mass % in terms of the amount of neodymium oxide with respect to the total amount of the resulting inorganic oxide) were dissolved, so as to add neodymium as the posterior additional element. The content of lanthanum oxide and neodymium oxide in total was 2.6 mol % with respect to the total amount of lanthanum oxide, neodymium oxide, aluminum oxide, and zirconium oxide, whereas at least 80% of primary particles had a particle size of 100 nm or less.

Example 14

The preparation of an inorganic oxide and a catalyst, and a catalyst durability test were carried out as in Example 9 except that a coprecipitate was produced by employing neodymium nitrate hexahydrate instead of lanthanum nitrate hexahydrate. In thus obtained inorganic oxide, the content of lanthanum oxide and neodymium oxide in total was 2.6 mol % with respect to the total amount of lanthanum oxide, neodymium oxide, aluminum oxide, and zirconium oxide, whereas at least 80% of primary particles had a particle size of 100 nm or less.

Comparative Example 4

While a mixture after the first baking obtained as in Example 9 except that no lanthanum nitrate hexahydrate was employed was used as it was as a carrier, the preparation of a catalyst and its durability test were carried out as in Example 8. The composition ratio in thus obtained inorganic oxide was aluminum oxide/zirconium oxide=50/95 (molar ratio).

Comparative Example 5

The preparation of an inorganic oxide and a catalyst, and a catalyst durability test were carried out as in Example 8 except that a coprecipitate was produced by using a solution obtained by dissolving 1 mol of aluminum nitrate nonahydrate, 0.95 mol of zirconium oxynitrate dihydrate, and 0.20 mol of lanthanum nitrate hexahydrate into 1600 mL of ion-exchanged water, that the composition ratio of the mixture was aluminum oxide/zirconium oxide/lanthanum oxide=50/95/10 (molar ratio), and that the content of lanthanum oxide in the mixture with respect to the total amount of lanthanum oxide, aluminum oxide, and zirconium oxide was 4.65 mol %. In thus obtained inorganic oxide, the content of lanthanum oxide was 5.98 mol % with respect to the total amount of lanthanum oxide, aluminum oxide, and zirconium oxide, whereas at least 80% of primary particles had a particle size of 100 nm or less.

TABLE 3

| | Mixture La$_2$O$_3$ or Nd$_2$O$_3$ content (mol %) | Posterior additional element | | | Inorganic oxide | |
|---|---|---|---|---|---|---|
| | | Species of element | Attached amount (mass %) | 2$^{nd}$ baking temperature (° C.) | Additional element oxide content (mol %) | Rhodium dispersibility (%) |
| Example 8 | 0.20(La$_2$O$_3$) | La | 5 | 800 | 1.56 | 9.4 |
| Example 9 | 1.25(La$_2$O$_3$) | La | 5 | 800 | 2.60 | 13.7 |
| Example 10 | 1.97(La$_2$O$_3$) | La | 5 | 800 | 3.32 | 11.8 |
| Example 11 | 2.9(La$_2$O$_3$) | La | 5 | 800 | 4.24 | 8.9 |
| Example 12 | 4.0(La$_2$O$_3$) | La | 5 | 800 | 5.34 | 7.0 |
| Example 13 | 1.25(La$_2$O$_3$) | Nd | 5 | 800 | 2.60 | 10.0 |
| Example 14 | 1.25(Nd$_2$O$_3$) | La | 5 | 800 | 2.60 | 133 |
| Comparative Example 4 | 0 | La | 5 | 800 | 1.36 | 5.5 |
| Comparative Example 5 | 4.65(La$_2$O$_3$) | La | 5 | 800 | 5.98 | 4.9 |

As shown in Table 3, the catalysts of Examples 8 to 14 obtained by further attaching lanthanum oxide or neodymium oxide to a mixture containing lanthanum oxide or neodymium oxide by an amount falling within the range of 0.20 to 4.0 mol % yielded sufficiently large values of rhodium dispersibility after the durability test in a high temperature environment. By contrast, Comparative Example 4 in which only the surface layer part contained lanthanum oxide and Comparative Example 5 in which the content of lanthanum oxide is more than 5.6 mol % in the inorganic oxide exhibited a small value of rhodium dispersibility after the durability test.

Example 15

Preparation of Catalyst

While being fully stirred, a solution obtained by dissolving 0.43 mol of aluminum nitrate nonahydrate, 0.95 mol of zirconium oxynitrate dihydrate, and 0.05 mol of lanthanum nitrate hexahydrate into 1600 mL of ion-exchanged water was added to aqueous ammonia containing ammonia by 1.2 times the neutralization equivalent of metal cations in the solution, so as to yield a pH of 9 or higher in the solution, whereby hydroxides of aluminum, zirconium, and lanthanum were coprecipitated, thus producing a coprecipitate containing these metal elements. After being centrifuged and then fully washed, the coprecipitate was temporarily baked by heating in the air at 400° C. for 5 hours. Subsequently, the solid obtained after the temporal baking was baked by heating in the air at 700° C. for 5 hours and then at 900° C. for 5 hours (first baking), whereby a mixture of oxides containing aluminum oxide, zirconium oxide, and lanthanum oxide was obtained. The composition ratio of the mixture was aluminum oxide/zirconium oxide/lanthanum oxide=21.5/95/2.5 (molar ratio), whereas the content of aluminum oxide in the mixture was 15 mol % with respect to the total amount of aluminum, zirconium, and lanthanum.

A suspension in which 47.5 g of thus obtained mixture were suspended in an aqueous lanthanum nitrate solution in which 6.5 g of lanthanum nitrate hexahydrate (by an amount to become 5 mass % in terms of the amount of lanthanum oxide with respect to the total amount of the resulting inorganic oxide) containing lanthanum as a posterior additional element were dissolved was stirred for 2 hours. Thereafter, the solid left after evaporating water from the suspension was baked by heating in the air at 110° C. for 12 hours and then at 800° C. for 5 hours (second baking), whereby a particulate inorganic oxide was obtained. Since lanthanum was further added as a posterior additional element after forming a composite oxide, the content of lanthanum as the additional element was locally increased in the surface layer part in primary particles in the inorganic oxide. When thus obtained inorganic oxide was observed by a TEM, it was seen that at least 80% of its primary particles had a particle size of 100 nm or less.

Thus obtained inorganic oxide as a carrier was added to an aqueous Rh(NO$_3$)$_3$ solution, the resulting mixture was stirred, and water was evaporated therefrom. The remaining solid was baked by heating in the air at 500° C. for 3 hours. The baked product was formed into a pellet having a length of 0.5 to 1 mm, whereby a catalyst in which rhodium was supported by the carrier was obtained. The amount of supported rhodium was about 0.5 g with respect to 100 g of the carrier.

Catalyst Durability (Heat Resistance) Test

Thus obtained pellet-shaped catalyst was left in a durability tester, so as to form a catalyst layer, and a durability test was performed for 5 hours, in which rich and lean gases having respective compositions shown in Table 1 were alternately caused to circulate through the catalyst layer at intervals of 5 minutes while setting the catalyst layer inlet gas temperature to 1000° C. and the space velocity to 10000/hr. For the catalyst after the durability test, the rhodium dispersibility (the ratio of rhodium atoms existing on the particle surface in all the rhodium atoms) was measured by CO absorption. A greater value of rhodium dispersibility corresponds to keeping a larger specific surface area, and means that the grain growth of rhodium particles is suppressed.

Example 16

The preparation of an inorganic oxide and a catalyst, and a catalyst durability test were carried out as in Example 15 except that a coprecipitate was produced by using a solution obtained by dissolving 1 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture was aluminum oxide/zirconium oxide/lanthanum oxide=50/95/2.5, and that the content of aluminum oxide in the mixture was 25 mol %.

Example 17

The preparation of an inorganic oxide and a catalyst, and a catalyst durability test were carried out as in Example 15 except that a coprecipitate was produced by using a solution obtained by dissolving 1.5 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture after the first baking was aluminum oxide/zirconium oxide/lanthanum oxide=75/95/2.5, and that the content of aluminum oxide in the mixture was 30 mol %.

Example 18

The preparation of an inorganic oxide and a catalyst, and a catalyst durability test were carried out as in Example 15 except that a coprecipitate was produced by using a solution obtained by dissolving 2.0 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture after the first baking was aluminum oxide/zirconium oxide/lanthanum oxide=100/95/2.5, and that the content of aluminum oxide in the mixture was 33.3 mol %.

Example 19

The preparation of an inorganic oxide and a catalyst, and a catalyst durability test were carried out as in Example 15 except that a coprecipitate was produced by using a solution obtained by dissolving 4.0 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture after the first baking was aluminum oxide/zirconium oxide/lanthanum oxide=200/95/2.5, and that the content of aluminum oxide in the mixture was 40 mol %.

Example 20

The preparation of an inorganic oxide and a catalyst, and a catalyst durability test were carried out as in Example 16 except that the mixture after the first baking was suspended in an aqueous neodymium nitrate solution in which 6.6 g of neodymium nitrate hexahydrate were dissolved instead of the aqueous lanthanum nitrate solution.

Example 21

The preparation of an inorganic oxide and a catalyst, and a catalyst durability test were carried out as in Example 15 except that a coprecipitate was produced by using a solution obtained by dissolving 1 mol of aluminum nitrate nonahydrate, 0.95 mol of zirconium oxynitrate dihydrate, and 0.05 mol of neodymium nitrate hexahydrate into 1600 mL of ion-exchanged water, that the composition ratio of the mixture after the first baking was aluminum oxide/zirconium oxide/neodymium oxide=50/95/2.5, and that the content of aluminum oxide in the mixture was 25 mol %.

Example 22

The preparation of an inorganic oxide and a catalyst, and a catalyst durability test were carried out as in Example 1 except that a coprecipitate was produced by using a solution obtained by dissolving 0.25 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture after the first baking was aluminum oxide/zirconium oxide/lanthanum oxide=12.5/95/2.5, and that the content of aluminum oxide in the mixture was 10 mol %.

Example 23

The preparation of an inorganic oxide and a catalyst, and a catalyst durability test were carried out as in Example 1 except that a coprecipitate was produced by using a solution obtained by dissolving 6 mol of aluminum nitrate nonahydrate, 0.95 mol of zirconium oxynitrate dihydrate, and 0.05 mol of lanthanum nitrate hexahydrate into 1600 mL of ion-exchanged water, that the composition ratio of the mixture after the first baking was aluminum oxide/zirconium oxide/lanthanum oxide=300/95/2.5, and that the content of aluminum oxide in the mixture was 42.9 mol %.

TABLE 4

| | Mixture | Posterior additional element | | | |
|---|---|---|---|---|---|
| | $Al_2O_3$ content (mol %) | Species of element | Attached amount (mass %) | $2^{nd}$ baking temperature (° C.) | Rhodium dispersibility (%) |
| Example 15 | 15 | La | 5 | 800 | 7.0 |
| Example 16 | 25 | La | 5 | 800 | 13.7 |
| Example 17 | 30 | La | 5 | 800 | 12.1 |
| Example 18 | 33.3 | La | 5 | 800 | 7.7 |
| Example 19 | 40 | La | 5 | 800 | 7.5 |
| Example 20 | 25 | Nd | 5 | 800 | 10.0 |
| Example 21 | 25 | La | 5 | 800 | 13.3 |
| Example 22 | 10 | La | 5 | 800 | 5.9 |
| Example 23 | 42.9 | La | 5 | 800 | 6.3 |

As shown in Table 4, the catalysts of Examples 15 to 23 obtained by further attaching lanthanum oxide or neodymium oxide to a mixture containing aluminum oxide yielded sufficiently large values of rhodium dispersibility after the durability test in a high temperature environment. In particular, Examples 15 to 21 whose aluminum oxide contents fell within the range of 15 to 40 mol % exhibited higher values of rhodium dispersibility after the durability test than those of Examples 22 and 23 whose aluminum oxide contents were out of the above-mentioned range.

INDUSTRIAL APPLICABILITY

The present invention provides an inorganic oxide which sufficiently suppresses the grain growth of metals supported thereby, an exhaust gas purifying catalyst carrier constituted thereby, and an exhaust gas purifying catalyst using the same.

The invention claimed is:
1. A particulate inorganic oxide comprising:
   aluminum oxide;
   a metal oxide forming no composite oxide with aluminum oxide; and
   an additional element including at least one of a rare-earth element and an alkali earth element,
   the inorganic oxide containing a secondary particle formed by aggregating primary particles,
   wherein at least a part of the secondary particle includes:
   a plurality of first primary particles, each having a particle size of 100 nm or less, containing aluminum oxide and the additional element; and
   a plurality of second primary particles, each having a particle size of 100 nm or less, containing the metal oxide and the additional element;
   wherein both of the first and the second primary particles has a surface concentrated region where the additional element has a locally increased content in a surface layer part thereof; and
   wherein a content of the additional element in terms of an amount of an oxide thereof is 5.6 mol % or less with respect to a total amount of the additional element, aluminum in aluminum oxide, and metal in the metal oxide.
2. An inorganic oxide according to claim 1, wherein the content of the additional element in terms of the amount of an oxide thereof is 1.5 to 5.6 mol % with respect to the total amount of the additional element, aluminum in aluminum oxide, and the metal element in the metal oxide.

3. An inorganic oxide according to claim 2, wherein at least 80% of the primary particles in the inorganic oxide have a particle size of 100 nm or less.

4. An inorganic oxide according to claim 1, wherein the content of aluminum oxide is 15 to 40 mol % with respect to the total amount of aluminum in aluminum oxide, the metal element in the metal oxide, and the additional element.

5. An inorganic oxide according to claim 4, wherein at least 80% of the primary particles in the inorganic oxide have a particle size of 100 nm or less.

6. An inorganic oxide according to claim 1, wherein, in the surface concentrated region, the additional element exists by 1 to 5 mass % in terms of an oxide thereof with respect to the total amount of the inorganic oxide.

7. An inorganic oxide according to claim 1, wherein the rare-earth element is at least one species of element selected from the group consisting of yttrium, lanthanum, praseodymium, neodymium, samarium, europium, gadolinium, terbium, dysprosium, holmium, erbium, thulium, ytterbium, and lutetium; and
wherein the alkali earth element is at least one species of element selected from the group consisting of magnesium, calcium, strontium, and barium.

8. An inorganic oxide according to claim 1, wherein the additional element is at least one species of element selected from the group consisting of yttrium, lanthanum, praseodymium, neodymium, ytterbium, magnesium, calcium, and barium.

9. An inorganic oxide according to claim 1, wherein the additional element is lanthanum or neodymium.

10. A particulate inorganic oxide comprising:
aluminum oxide;
zirconium oxide; and
an additional element including at least one of a rare-earth element and an alkali earth element,
the inorganic oxide containing a secondary particle formed by aggregating primary particles;
wherein at least a part of the secondary particle includes: a plurality of first primary particles, each having a particle size of 100 nm or less, containing aluminum oxide and the additional element; and
a plurality of second primary particles, each having a particle size of 100 nm or less, containing zirconium oxide and the additional element;
wherein both of the first and the second primary particles has a surface concentrated region where the additional element has a locally increased content in a surface layer part thereof; and
wherein a content of the additional element in terms of an amount of an oxide thereof is 5.6 mol % or less with respect to a total amount of the additional element, aluminum in aluminum oxide, and zirconium in zirconium oxide.

11. An inorganic oxide according to claim 10, wherein the content of the additional element in terms of the amount of an oxide thereof is 1.5 to 5.6 mol % with respect to the total amount of the additional element, aluminum in aluminum oxide, and zirconium in zirconium oxide.

12. An inorganic oxide according to claim 11, wherein at least 80% of the primary particles in the inorganic oxide have a particle size of 100 nm or less.

13. An inorganic oxide according to claim 10, wherein the content of aluminum oxide is 15 to 40 mol % with respect to the total amount of aluminum in aluminum oxide, the metal element in the metal oxide, and the additional element.

14. An inorganic oxide according to claim 13, wherein at least 80% of the primary particles in the inorganic oxide have a particle size of 100 nm or less.

15. An inorganic oxide according to claim 10, wherein, in the surface concentrated region, the additional element exists by 1 to 5 mass % in terms of an oxide thereof with respect to the total amount of the inorganic oxide.

16. An inorganic oxide according to claim 10, wherein the rare-earth element is at least one species of element selected from the group consisting of yttrium, lanthanum, praseodymium, neodymium, samarium, europium, gadolinium, terbium, dysprosium, holmium, erbium, thulium, ytterbium, and lutetium; and
wherein the alkali earth element is at least one species of element selected from the group consisting of magnesium, calcium, strontium, and barium.

17. An inorganic oxide according to claim 10, wherein the additional element is at least one species of element selected from the group consisting of yttrium, lanthanum, praseodymium, neodymium, ytterbium, magnesium, calcium, and barium.

18. An inorganic oxide according to claim 10, wherein the additional element is lanthanum or neodymium.

19. A particulate inorganic oxide obtainable by a manufacturing method comprising:
a coprecipitation step of producing a coprecipitate containing aluminum, a metal element forming no composite oxide with aluminum oxide when in an oxide, and an additional element comprising at least one of a rare-earth element and an alkali earth element from a solution containing aluminum, the metal element, and the additional element dissolved therein;
a first baking step of yielding an oxide mixture by baking the coprecipitate; and
a second baking step of attaching the additional element including at least one of a rare-earth element and an alkali earth element to the mixture and further baking the mixture;
wherein, in the manufacturing method, the content of the additional element in terms of the amount of an oxide thereof is 4.0 mol % or less with respect to the total amount of the additional element, aluminum, and the metal element.

20. An inorganic oxide according to claim 19, wherein the content of the additional element in terms of the amount of an oxide thereof in the solution is 0.20 to 4.0 mol % with respect to the total amount of the additional element, aluminum, and the metal element.

21. An inorganic oxide according to claim 19, wherein the content of aluminum in terms of the amount of an oxide thereof in the solution is 15 to 40 mol % with respect to the total amount of aluminum, the metal element, and the additional element.

22. An inorganic oxide according to claim 19, wherein, in the second baking step, the additional element is attached by such an amount as to become 1 to 5 mass % in terms of the amount of an oxide thereof with respect to the total amount of the inorganic oxide obtained.

23. An inorganic oxide according to claim 19, wherein the coprecipitate is baked by heating to 600 to 1200° C. in an oxidizing atmosphere in the first baking step; and wherein the mixture having the additional element attached thereto is baked by heating to 500 to 900° C. in the second baking step.

24. An inorganic oxide according to claim 19, wherein the rare-earth element is at least one species of element selected from the group consisting of yttrium, lanthanum, praseodymium, neodymium, samarium, europium, gadolinium, terbium, dysprosium, holmium, erbium, thulium, ytterbium, and lutetium; and wherein the alkali earth element is at least one species of element selected from the group consisting of magnesium, calcium, strontium, and barium.

25. An inorganic oxide according to claim 19, wherein the additional element is at least one species of element selected from the group consisting of yttrium, lanthanum, praseodymium, neodymium, ytterbium, magnesium, calcium, and barium.

26. An inorganic oxide according to claim 19, wherein the additional element is lanthanum or neodymium.

27. A particulate inorganic oxide obtainable by a manufacturing method comprising:
a coprecipitation step of producing a coprecipitate containing aluminum, zirconium, and an additional element including at least one of a rare-earth element and an alkali earth element from a solution containing aluminum, zirconium, and the additional element dissolved therein;
a first baking step of yielding an oxide mixture by baking the coprecipitate; and
a second baking step of attaching the additional element including at least one of a rare-earth element and an alkali earth element to the mixture and further baking the mixture;
wherein, in the manufacturing method, the content of the additional element in terms of the amount of an oxide thereof is 4.0 mol % or less with respect to the total amount of the additional element, aluminum, and zirconium.

28. An inorganic oxide according to claim 27, wherein the content of the additional element in terms of the amount of an oxide thereof in the solution is 0.20 to 4.0 mol % with respect to the total amount of the additional element, aluminum, and zirconium.

29. An inorganic oxide according to claim 27, wherein the content of aluminum in terms of the amount of an oxide thereof in the solution is 15 to 40 mol % with respect to the total amount of aluminum, zirconium, and the additional element.

30. An inorganic oxide according to claim 27, wherein, in the second baking step, the additional element is attached by such an amount as to become 1 to 5 mass % in terms of the amount of an oxide thereof with respect to the total amount of the inorganic oxide obtained.

31. An inorganic oxide according to claim 27, wherein the coprecipitate is baked by heating to 600 to 1200° C. in an oxidizing atmosphere in the first baking step; and wherein the mixture having the additional element attached thereto is baked by heating to 500 to 900° C. in the second baking step.

32. An inorganic oxide according to claim 27, wherein the rare-earth element is at least one species of element selected from the group consisting of yttrium, lanthanum, praseodymium, neodymium, samarium, europium, gadolinium, terbium, dysprosium, holmium, erbium, thulium, ytterbium, and lutetium; and wherein the alkali earth element is at least one species of element selected from the group consisting of magnesium, calcium, strontium, and barium.

33. An inorganic oxide according to claim 27, wherein the additional element is at least one species of element selected from the group consisting of yttrium, lanthanum, praseodymium, neodymium, ytterbium, magnesium, calcium, and barium.

34. An inorganic oxide according to claim 27, wherein the additional element is lanthanum or neodymium.

35. An exhaust gas purifying catalyst carrier containing the inorganic oxide according to any one of claims 1 to 34.

36. An exhaust gas purifying catalyst comprising the exhaust gas purifying catalyst carrier according to claim 35, and rhodium supported thereby.

37. An exhaust gas purifying catalyst according to claim 36, wherein at least a part of rhodium in the catalyst is supported so as to come into contact with the surface concentrated region in the surface layer part of primary particles in the inorganic oxide.

38. A particulate inorganic oxide comprising:
aluminum oxide;
a metal oxide forming no composite oxide with aluminum oxide; and
an additional element including at least one of a rare-earth element and an alkali earth element,
the inorganic oxide containing a secondary particle formed by aggregating primary particles,
wherein at least a part of the secondary particle includes:
a plurality of first primary particles, each having a particle size of 100 nm or less, containing aluminum oxide and the additional element; and
a plurality of second primary particles, each having a particle size of 100 nm or less, containing the metal oxide and the additional element;
wherein both of the first primary particles and the second primary particles include a surface part having a first amount of the additional element, defining a surface concentrated region, and an inner part having a second amount of the additional element, the first amount of the additional element being greater than the second amount thereof; and
wherein an amount of an oxide of the additional element is 5.6 mol % or less with respect to a total amount of the oxide of the additional element, the aluminum oxide, and the metal oxide.

39. A particulate inorganic oxide comprising:
aluminum oxide;
zirconium oxide; and
an additional element including at least one of a rare-earth element and an alkali earth element,
the inorganic oxide containing a secondary particle formed by aggregating primary particles;
wherein at least a part of the secondary particle includes: a plurality of first primary particles, each having a particle size of 100 nm or less, containing aluminum oxide and the additional element; and
a plurality of second primary particles, each having a particle size of 100 nm or less, containing zirconium oxide and the additional element;
wherein both of the first primary particles and the second primary particles include a surface part having a first amount of the additional element, defining a surface concentrated region, and an inner part having a second amount of the additional element, the first amount of the additional element being greater than the second amount thereof; and
wherein an amount of an oxide of the additional element is 5.6 mol % or less with respect to a total amount of the oxide of the additional element, the aluminum oxide, and the zirconium oxide.

* * * * *

UNITED STATES PATENT AND TRADEMARK OFFICE
CERTIFICATE OF CORRECTION

| | | |
|---|---|---|
| PATENT NO. | : 8,242,046 B2 | Page 1 of 1 |
| APPLICATION NO. | : 10/572040 | |
| DATED | : August 14, 2012 | |
| INVENTOR(S) | : Akira Morikawa et al. | |

It is certified that error appears in the above-identified patent and that said Letters Patent is hereby corrected as shown below:

On the title page, in item (73) Assignees, "Kabushiki Kaisha Toyota Chuo" should read --Kabushiki Kaisha Toyota Chuo Kenkyusho--.

Signed and Sealed this
Fifth Day of August, 2014

Michelle K. Lee
*Deputy Director of the United States Patent and Trademark Office*